H. R. RICARDO.
LUBRICATING MECHANISM.
APPLICATION FILED AUG. 6, 1918.

1,328,015.

Patented Jan. 13, 1920.
2 SHEETS—SHEET 1.

Inventor
Harry R. Ricardo

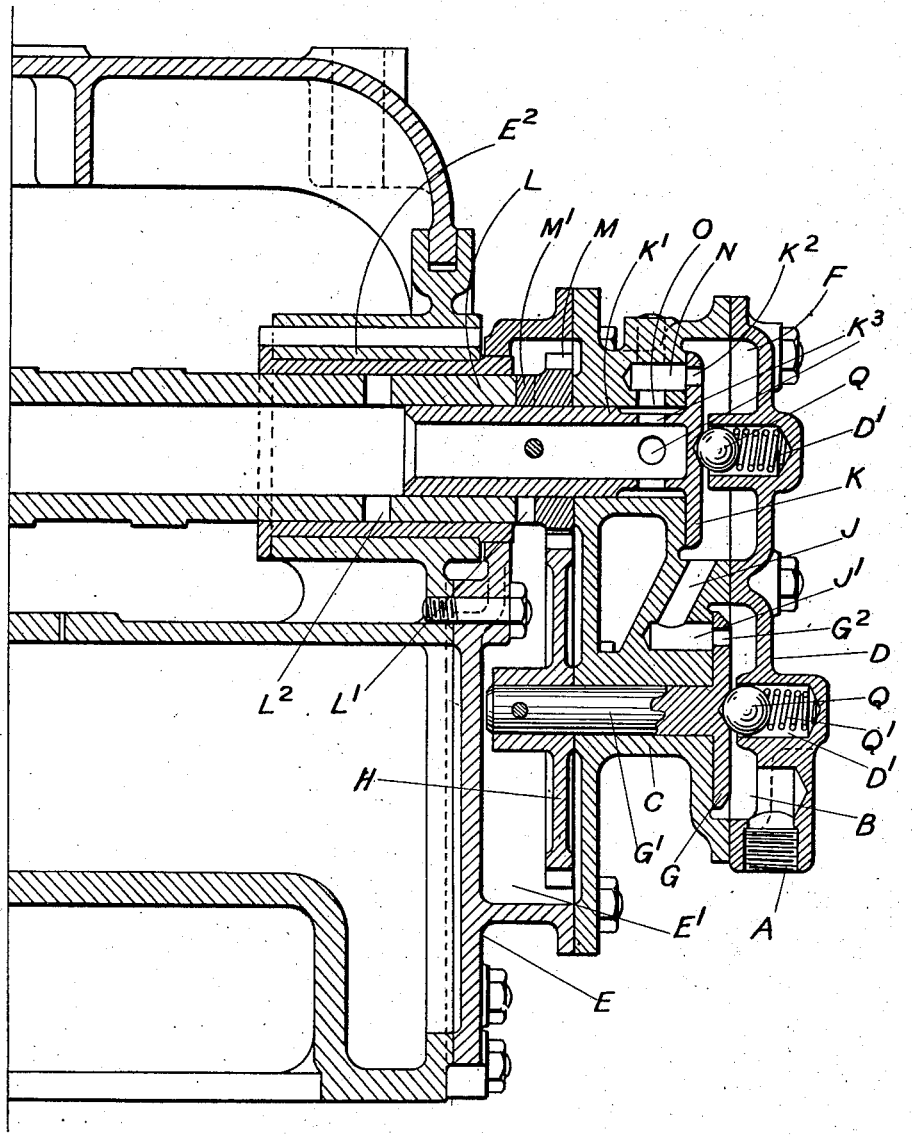

UNITED STATES PATENT OFFICE.

HARRY RALPH RICARDO, OF LONDON, ENGLAND.

LUBRICATING MECHANISM.

1,328,015.

Specification of Letters Patent.   Patented Jan. 13, 1920.

Application filed August 6, 1918. Serial No. 248,596.

*To all whom it may concern:*

Be it known that I, HARRY RALPH RICARDO, subject of the King of England, residing at London, in England, have invented certain new and useful Improvements in Lubricating Mechanism, of which the following is a specification.

This invention relates to lubricating mechanism and has for its object to provide means for lubricating more particularly all the lightly loaded bearings comprised in the secondary mechanism of an engine.

Designers of high speed engines employing forced lubrication are frequently faced with the difficulty that they have in their engines a number of bearings which require a certain amount of lubrication but which have neither the sealing surface nor the drainage capacity to deal with a free flow of oil from the main lubricating system. In such cases it is customary either to provide a separate pump to supply these bearings which is somewhat objectionable because small pumps dealing with very small quantities are inherently unreliable and necessitate a considerable amount of reduction gearing if the supply of oil is to be reduced to anything like the quantity which the bearing actually requires, and which can be adequately drained from it. Alternatively it is customary to supply these bearings from the main pressure oil supply through the medium of a restricted passage or throttle. Such a restriction, if it is to reduce the supply adequately, must necessarily be very small indeed and therefore liable to choke up very readily. By means of the present invention it is possible to lubricate these bearings directly from the main pressure oil supply without the use of any restricted passages and at the same time to provide a reliable means of supplying each bearing with a measured quantity of oil.

According to this invention a chamber is provided to which lubricant is supplied under pressure and from this chamber leads a passage to the part or parts to which the lubricant is to be delivered. In this passage are arranged ports controlled by two or more valves which are constantly actuated in such relation that synchronism in the opening of the ports can only occur and a through passage for the flow of lubricant be thus provided intermittently and at predetermined intervals. In the preferred construction each valve is of the rotary type and one valve and the port controlled thereby are disposed in the above mentioned chamber. From this port the delivery passage leads to a second chamber in which the second rotary valve is so arranged as to control one or more ports through which the lubricant passes to the parts to be lubricated. The valve spindles are so geared together that while the two valves are constantly rotated they are only intermittently in phase so as to permit the passage of lubricant in predetermined quantity directly from the first chamber through the port therein to the second chamber and thence through the port or ports in that chamber to the parts to be lubricated. Each valve is conveniently formed as a disk in which is one or more openings, each of these openings corresponding in dimensions and position to the port or ports controlled by the valve. On the spindle of each rotary disk valve is fixed a toothed wheel and these wheels mesh together their dimensions and the numbers of the teeth being in such relation that while the two valves are constantly rotated synchronism in the opening of the ports in both chambers will only occur intermittently when a through passage for the flow of lubricant will be thus provided.

This effect is obtained by providing one of the toothed wheels with one or more "hunting" teeth so that the gear ratio expressed in terms of the numbers of teeth in the wheels is $x : (nx \pm 1)$. The toothed wheel on the spindle of the valve in the second chamber is preferably that which has the smaller number of teeth while the wheel on the spindle of the valve in the first chamber has for example either the same number of teeth $\pm 1$ or twice the number of teeth in the other wheel $\pm 1$. Thus as each valve rotates the opening therein and the port beneath the valve register once in each revolution but since these valves are in circuit "in series" it follows that the oil can only flow through the two valves and from thence to the bearings when both valve openings and their corresponding ports register simultaneously which may be say only once in 20 revolutions, depending upon the number of teeth employed in the gearing connecting the two valves. Thus for instance if one gear wheel has 29 teeth and the other 30 teeth it follows that the two valves will be in phase every 30 revolutions and oil will pass through to the secondary bearing once every thirty revolutions of the valves. Again if the portion of the revolution during which the port of either valve is uncovered is one thirtieth (equal to 12°) it follows that the total period during which the particular bearing is exposed to the main oil supply will be 1/900th and assuming its capacity for sealing the oil to be the same as one of the primary bearings it follows that the quantity of oil delivered to this bearing will be 1/900th of that delivered to the primary bearing.

Preferably the first valve which is in communication with the main oil supply is provided with only one port in its seating through which the oil passes to the second valve in the seating of which there may be provided any convenient number of ports each of which is connected to and supplies a separate bearing or system of bearings. In this manner each bearing or system of bearings is placed in free and unrestricted communication with the main oil pressure supply but only intermittently and for a very short period the actual period depending upon the number of teeth in the gear wheel mounted on the first valve stem and the number of degrees during which the port beneath this valve is open. In practice it is found convenient to gear the two valves together in the ratio of $x : (2x \pm 1)$ rather than $x : (x \pm 1)$ the wheel having $2x \pm 1$ teeth being fitted to the first valve of the series. By this means it is possible to further reduce the phase period without increasing the distance between the centers of the valves.

Rotation may be imparted to the valves in various ways but conveniently that valve which is disposed in the second chamber is mounted on the end of a shaft such as a cam shaft of the engine. This shaft may be formed hollow and oil led thereinto through a port in the second chamber controlled by the valve. From other ports in this chamber oil is conveyed in some suitable manner to other secondary bearings.

The device may thus be employed to control and effect the supply of lubricant to a number of bearings the detail construction of the lubricating mechanism and the means used to rotate the valves being modified to meet requirements.

The accompanying drawings illustrate by way of example one construction of the improved lubricating mechanism.

In these drawings,

Fig. 2 is a sectional elevation on the line 2—2 of Fig. 1 the valves however being here shown as rotated into the positions in which the openings therein coincide with the ports beneath them.

Like letters indicate like parts throughout the drawings.

Figure 1:
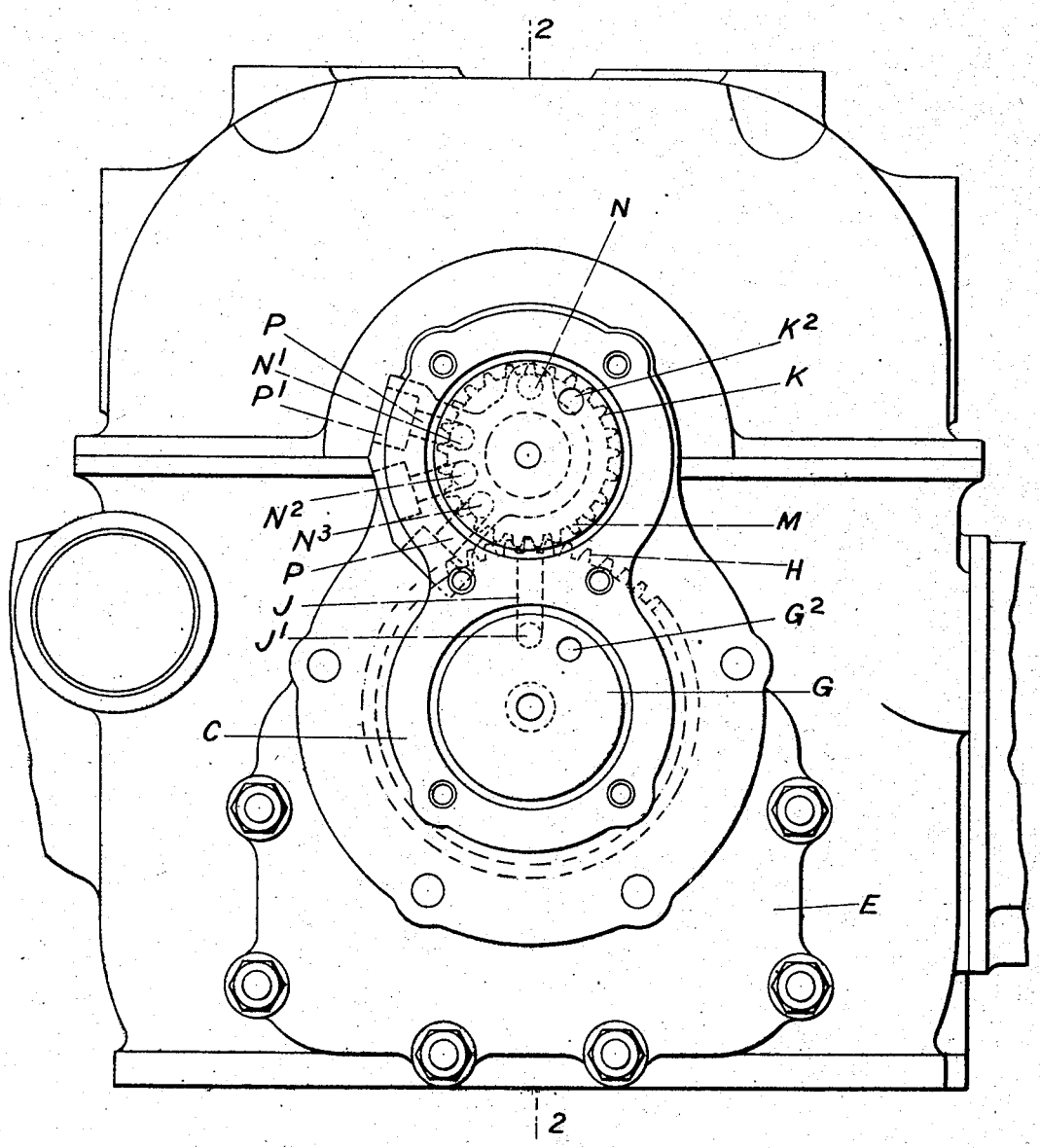
Figure 1 is an end elevation of the mechanism with the outer casting which covers the valves removed.

Lubricant is supplied under pressure through an orifice A into a chamber B of suitable shape and dimensions the chamber being conveniently formed by a casting C and a cover plate D. The casting C is bolted to some convenient part E of the engine the cover plate D being bolted or otherwise attached to the casting C. Between the casting C and the cover plate D is formed a second chamber F. That part of the casting C which constitutes what may be termed the back wall of the chamber B is formed flat so as to serve as a seating for a disk valve G. This valve is carried on a spindle G' which passes through a hole in the casting and projects into a chamber E' formed between the engine part E and the casting C. On this end of the spindle G' is fixed a toothed wheel H. The disk valve G has formed through its face an opening $G^2$ which is constituted either by a hole through the disk as in the construction illustrated or by a slot cut in from the periphery of the disk. A passage J is formed in the casting C and this passage terminates at one end in a port J' in the valve seat beneath the valve G while at the other end the passage leads into the second chamber F. The position of the port J' corresponds in respect of its radial distance from the axis of the valve spindle G' with the position of the opening $G^2$ in the valve G the dimensions of the opening of the port being approximately equal but the opening $G^2$ being if anything somewhat smaller in diameter than the diameter of the port J'. Thus the port J' will be intermittently uncovered when the opening $G^2$ passes over the port as the valve G is rotated on its seating.

The back wall of the chamber F is in a like manner formed flat to constitute a seating for a valve K which is carried on a spindle K' in this case preferably formed hollow, which passes through a hole in the casting C. The inner end of the spindle K' enters and fits closely within the end of a hollow shaft L which is carried in a bearing $E^2$ suitably formed or mounted in the engine part E. On the spindle K' is fixed a toothed wheel M which lies in the chamber E' and gears with the toothed wheel H. The spindle K' is connected to the shaft L in some convenient manner so that as the shaft L rotates it will also cause the valve K to rotate and so through the toothed wheels M and H simultaneous rotation of the valve G will be brought about. A convenient method of connecting the valve spindle K' to the shaft L comprises as shown in Fig. 2 a series of dog teeth or projections M' formed on the face of the toothed wheel M and adapted to engage similar teeth or projections L' formed on the end of the shaft L. The latter may conveniently be a cam shaft of the engine and this method of connecting the valve spindle K' thereto so as to impart rotary motion from the cam shaft to the valves K and G permits of these valves being taken down as the whole casting C can be detached and removed with the parts contained therein without disturbing the shaft L.

Through the face of the disk valve K is formed an opening K² similar to the opening G² in the valve G. In the seating beneath the valve K are several ports N N' N² N³. The port N constitutes one end of a passage O of which the other end opens radially inward toward the axis of the spindle K'. Opposite the end of this passage there are formed a series of holes K³ through the wall of the hollow spindle K' so that lubricant can pass through the passage O and openings K³ into and along through the spindle K'. Thence the oil will flow into the hollow shaft L and some of it can find its way to the bearing E² through radial holes L² in this shaft. The oil can flow along the interior of the shaft L and be similarly distributed to one or more other bearings along the length of this shaft. The ports N' N² N³ lead into a series of passages P formed in the casting C as shown in Fig. 1, the outer end of each of these passages terminating in a socket P' into which a pipe union or the like may be screwed or such other connection fixed as to enable lubricant to be conveyed to the secondary bearings of the engine.

Each of the valves G and K is kept up to its seat by means of a ball Q carried in a recess D' formed in the cover plate D a spring Q' being disposed behind each ball so as to press the ball against the center of the face of the valve.

The dimensions of the toothed wheels H and M are such and the numbers of teeth are so determined that as the valves G and K are simultaneously rotated synchronism in the opening of any one of the ports N N' N² N³ and of the port J' cannot occur at every revolution but the valves will only be in phase intermittently. Consequently since oil can only flow freely from the chamber B through the passage J into the chamber F and thence through one or other of the passages O or P to the secondary bearings when the opening of the port J' and of one or other of the ports N N' N² N³ synchronizes, oil though constantly under pressure in the chamber B will only be supplied intermittently to the bearings or other parts to be lubricated in such quantity as is required for those bearings. As already indicated the gear ratio expressed in terms of the numbers of teeth in the wheels is $x : (nx \pm 1)$. In place however of the number 1 in this ratio some other number may be substituted which will bring about the necessary "hunting" effect and cause the valve to be in phase at the required intervals. Thus for example in the gear more particularly described and illustrated in the accompanying drawings the ratio in terms of the numbers of teeth is $x : (2x-2)$, the wheel M having 27 teeth while the wheel H has 52 teeth. Obviously the gear ratio may be varied as found desirable in accordance with the frequency with which it is necessary for the valves to be in phase so as to insure the required quantity of lubricant being delivered to the several bearings.

The number of ports in the seating beneath the valve K may vary in accordance with the number of bearings to which oil is to be supplied and these ports may be disposed around the axis of the valve spindle as found convenient. Also if circumstances require synchronism in the opening of the ports more often than can conveniently be effected by suitable proportioning of the gear wheels there may be formed more than one port J' in the seating beneath the valve G each of these ports constituting the end of a passage such as J leading into the second chamber F.

Similarly more frequent phasing of the valves can be brought about by providing more than one opening such as K² in the valve K, or again more than one opening such as G² may be formed in the valve G.

The lubricating mechanism may be modified in various ways to meet requirements.

Though as above more particularly described the power for rotating tht valves is preferably applied first to the spindle of the secondary valve K and thence through gearing is communicated to the spindle of the primary valve G it is obvious that if desired the primary valve may be directly driven and the secondary valve or valves K may be indirectly driven from the toothed wheel H.

What I claim as my invention and desire to secure by Letters Patent is:—

1. A device for intermittently supplying oil to the bearings of an engine comprising, in addition to the moving parts of the engine, a chamber adapted to receive a supply of lubricant under pressure, a conduit leading from this chamber through which the lubricant passes to the parts to be lubricated, a plurality of ports in this conduit, a plurality of valves for controlling these ports, and means for actuating said valves in such relation to each other that synchronism in the opening of the ports will only occur and a through passage for the flow of lubricant from the chamber be provided intermittently and at predetermined intervals.

2. A device for intermittently supplying oil to the bearings of an engine comprising, in addition to the moving parts of the engine, a chamber adapted to receive a supply of lubricant under pressure, a conduit leading from this chamber through which the lubricant passes to the parts to be lubricated, a plurality of ports in this conduit, a plurality of rotary valves controlling these ports, and means for actuating said valves in such relation to each other that synchronism in the opening of the ports will only occur and a through passage for the flow of lubricant from the chamber be provided intermittently and at predetermined tervals.

3. A device for intermittently supplying oil to the bearings of an engine comprising, in addition to the movable parts of the engine, a chamber adapted to receive a supply of lubricant under pressure, a second chamber, a conduit leading from the port in the first chamber into the second chamber, a valve controlling this port, a conduit leading from a port in the second chamber to the parts to be lubricated, a second valve controlling this port, and means for actuating the valves in such relation to each other that synchronism in the opening of the ports by the valves which respectively control them will only occur and a through passage for the flow of lubricant from the first chamber be provided intermittently and at predetermined intervals, as set forth.

4. A device for intermittently supplying oil to the bearings of an engine comprising, in addition to the moving parts of an engine, a chamber adapted to receive a supply of lubricant under pressure, a second chamber, a conduit leading from a port in the first chamber into the second chamber, a rotary valve controlling this port, a conduit leading from the port in the second chamber to the parts to be lubricated, a second rotary valve controlling this port, and means for rotating both valves in such relation to each other that synchronism in the opening of the ports by the valves which respectively control them will only occur and a through passage for the flow of lubricant from the first chamber being provided intermittently and at predetermined intervals, as set forth.

5. An intermittent oil feed attachment for engines comprising, in combination, a chamber adapted to receive a supply of lubricant under pressure, a second chamber, a conduit leading from the port in the first chamber into the second chamber, a rotary valve controlling this port, a conduit leading from the port in the second chamber to the parts to be lubricated, a second rotary valve controlling this port, means for rotating one of said valves, and gearing between the valves such that as the two valves rotate they are only in and at predetermined intervals so as to permit the lubricant to pass simultaneously through the ports, as set forth.

6. An intermittent oil feed attachment for engines comprising, in combination, a chamber adapted to receive a supply of lubricant under pressure, a second chamber, a conduit leading from the port in the first chamber into the second chamber, a valve controlling this port, a plurality of conduits leading from a series of ports from the second chamber to the parts to be lubricated, a second valve controlling this series of ports, and means for actuating the valves in such relation to each other that synchronism in the opening of the ports in the first chamber and the opening of each of the ports in the second chamber by the valves which respectively control them will only occur and a through passage for the flow of lubricant from the first chamber be provided intermittently and at predetermined intervals, as set forth.

7. An intermittent oil feed attachment for engines comprising, in combination, a chamber adapted to receive a supply of lubricant under pressure, a second chamber, a conduit leading from the port in the first chamber into the second chamber, a rotary valve controlling this port, a plurality of conduits leading from a series of ports in the second chamber to the parts to be lubricated, a second rotary valve controlling this series of ports, and means for rotating both valves in such relation to each other that synchronism in the opening of the port in the first chamber and the opening of each of the ports in the second chamber by the valves which respectively control them will only occur and a through passage for the flow of lubricant from the first chamber be provided intermittently and at predetermined intervals as set forth.

8. In lubricating mechanism the combination of a chamber having on one wall a flat surface in which is a port, a second chamber having on one wall a flat surface in which is a port, means for supplying lubricant under pressure to the first chamber, a passage leading from the port in the first chamber into the second chamber, a disk in which is an opening constituting a valve and rotatably mounted against the flat surface in the first chamber so as to control the opening of the port, a passage leading from the port in the second chamber to the parts to be lubricated, a second disk in which is an opening constituting a valve and rotatably mounted against the flat surface in the second chamber so as to control the opening of the port therein, and means for rotating both valves in such relation to each other that synchronism in the opening of the ports by the valves which respectively control them will only occur and a through passage for the flow of lubricant from the first chamber be provided intermittently and at predetermined intervals as set forth.

9. In lubricating mechanism the combination of a chamber having on one wall a flat surface in which is a port, a second chamber having on one wall a flat surface in which are a series of ports, means for supplying lubricant under pressure to the first chamber, a passage leading from the port in the first chamber into the second chamber, a disk in which is an opening constituting a valve and rotatably mounted against the flat surface in the first chamber so as to control the opening of the port, a plurality of passages leading from the ports in the second chamber to the parts to be lubricated, a second disk in which is an opening constituting a valve and rotatably mounted against the flat surface in the second chamber so as to control in succession the opening of the series of ports therein, and means for rotating both valves in such relation to each other that synchronism in the opening of the port in the first chamber and the opening of each of the ports in the second chamber by the valves which respectively control them will only occur and a through passage for the flow of lubricant from the first chamber be provided intermittently and at predetermined intervals as set forth.

10. In lubricating mechanism the combination of a chamber having on one wall a flat surface in which is a port, a second chamber having on one wall a flat surface in which are a series of ports, means for supplying lubricant under pressure to the first chamber, a passage leading from the port in the first chamber into the second chamber, a disk in which is an opening constituting a valve and rotatably mounted against the flat surface in the first chamber so as to control the opening of the port, a plurality of passages leading from the ports in the second chamber to the parts to be lubricated, a second disk in which is an opening constituting a valve and rotatably mounted against the flat surface in the second chamber so as to control in succession the opening of the series of ports therein, means for rotating one of the valves, and gearing between the valves such that as the two valves rotate they are only in phase intermittently and at predetermined intervals so as to permit lubricant to pass simultaneously through the ports in the two chambers as set forth.

In testimony whereof I have signed my name to this specification.

HARRY RALPH RICARDO.